Patented Mar. 19, 1929.

1,705,493

UNITED STATES PATENT OFFICE.

EMIL E. NOVOTNY, OF LOGAN, PENNSYLVANIA, AND DONALD S. KENDALL, OF LITTLE FALLS, NEW JERSEY, ASSIGNORS TO JOHN STOGDELL STOKES, OF HUNTINGDON VALLEY P. O., PENNSYLVANIA.

SYNTHETIC RESIN COMPOSITION OF THE PHENOL-FURFURAL TYPE.

No Drawing.   Application filed September 17, 1921. Serial No. 501,273.

This invention relates to synthetic resins and the process of making the same and has particular application to the manufacture of furfural-phenol condensation products adapted especially for molding purposes and which when subjected to the action of heat, or heat and pressure will undergo chemical reaction and assume a hard, set and infusible form.

The present invention is in the nature of an improvement on the invention forming the subject matter of our Patent No. 1,398,146, dated November 22, 1921.

In said earlier patent we have described the production of synthetic resins in the nature of condensation products which are formed by treating a mixture of furfural and phenol with a suitable catalyst to form a fusible resin, and then subsequently treating this fusible resin with a hardening agent so that the mass will assume its final infusible state under the action of heat, or heat and pressure.

After prolonged experiments we have discovered that in the production of these furfural-phenol condensation products it is not necessary to employ either a catalytic agent, or hardening agent to produce an infusible product, but that by simply mixing certain proportions of phenol and furfural and subjecting such mixture to an unexpectedly high and hitherto unemployed temperature for this purpose, for a relatively long period of time, we obtain a hard, infusible condensation product. We have further found that if it is desired to produce an intermediate or partially reacted product, or in other words a fusible resin, which may subsequently be caused to assume an infusible state, as by the application of further heat, it is only necessary to subject a mixture of the furfural and phenol to the same high temperature as above mentioned as used for making the infusible product, but employing such temperature for a relatively short period of time. In other words, heating the mixture of furfural and phenol at a high and hitherto unused temperature for a relatively short period of time, say about one hour, will produce a fusible resin which may subsequently be transformed into infusibility as during a molding operation, as by the further application of heat, or heat and pressure.

We have further discovered that a fusible resin formed by mixing and heating furfural and phenol may be rapidly transformed into an insoluble, infusible condensation product by further heating the mass at a relatively low temperature in the presence or with the addition of a hardening agent such as hexa-methylene-tetramin, or, if preferred, furfuramid. Thus the fusible resin, containing the hardening agent may be used in molding articles of various sorts, and under the molding heat and pressure will be transformed from its fusible state into its infusible, insoluble condition.

We have also found that a fusible synthetic resin may be made by heating a mixture of furfural and phenol in the presence of a basic catalyst, such as potassium-carbonate, this fusible resin being subsequently capable of being brought to a final infusible state by the further application of a high degree of heat or heat and pressure. The fusible resin formed by the reaction of the furfural-phenol and the basic catalyst may be more speedily and quickly brought to its infusible condition, and at a lower degree of temperature, when we use a hardening agent such as hexa-methylene-tetramin or furfuramid prior to the final heating or molding operation. As the use of a basic catalyst such as potassium-carbonate, and the use of furfuramid as a hardening agent form the subject matter of divisional applications, no claim is made herein to the same.

In order to give a complete understanding of our invention we will now describe certain preferred examples thereof.

*Example 1.*—To 100 parts of phenol, we add an equal amount or 100 parts of furfural, and thoroughly mix the same to produce a thin, free-flowing liquid. This mixture is then placed in a closed, pressure-resisting container or autoclave, and subjected to the action of heat at a temperature of from 420° F. to 450° F., for a period of at least two hours, at the end of which time an examination will show that the liquid mixture has been transformed into a non-flowing, hard and infusible condensation product, the reaction between the phenol and the furfural having been complete. We have found that if the liquid-like mixture of furfural and phenol be subjected to heat at lower temperatures, or the temperatures heretofore employed in the formation of condensation products, that is from 350° downward, no change will take place in the liquid-like mixture, that is, it will not react to form a condensation product but will retain its liquid-like state no matter for what length of time this degree of heat may be applied. We have discovered, however, that at above 350°, and certainly at approximately 420° F., the reaction will take place and the liquid mixture transferred into the infusible, insoluble condensation product.

This product thus formed may be ground into a powder and used as a filler with reactive synthetic resins while in their soluble or fusible form for the molding of various articles.

It will be noted that in the method of making an infusible, insoluble condensation product set forth in this example, we dispense entirely with the use of either a catalyst or a hardening agent, relying entirely and solely upon the reaction between the two ingredients, furfural and phenol.

*Example 2.*—In some instances it will be found very desirable to produce an intermediate product or fusible resin made solely from a mixture of furfural and phenol which is capable of potentially reacting at a subsequent stage, and under additional heat treatment, to assume the insoluble, infusible state. Under such circumstances we have produced such a fusible resin by mixing 100 parts of phenol and 100 parts of furfural, and then subjecting the liquid-like mixture to a relatively high degree of heat, from 420° F. to 450° F., but for a relatively short period of time, for example one hour, the heating taking place in a closed autoclave or container. At the end of the allotted time, the liquid will be found to have been transformed into a solid, soluble body, which, however, is capable of being reduced to a state of plasticity, and of being molded when subjected to heat, or heat and pressure. The water of condensation may be evaporated or driven off from the mass while the latter is still in the autoclave or container, and the resultant fusible resin or condensation product may now be removed and set aside for future use. In using this fusible resin, it is preferably ground up into powdered form, or dissolved in a suitable solvent, such as alcohol, and thus used for incorporation with or impregnating a body of fibrous material or other suitable filler, the resultant product being subsequently useful for molding articles under heat and pressure. During the molding operation, in order to transform the fusible resin into its infusible, insoluble state, it will be found necessary to again apply a relatively high degree of heat, for example, from 420° to 450° F., as the reaction will not take place at the relatively low temperatures used in so transforming the ordinary phenol-formaldehyde condensation products.

*Example 3.*—If it be desired to hasten the reaction between the furfural and phenol, in forming an infusible condensation product, and to enable the molding of articles at a relatively low temperature, or far below that set forth in the two examples above given, we may proceed as follows. We first make a fusible, soluble resin, as set forth in Examples 1 and 2 above given, by mixing 100 parts of phenol with from 15 to 100 parts of furfural, and subjecting the same to the high temperature—420–450° F. in the autoclave. Any water of condensation or excess phenol is then removed and the fusible, soluble resin remaining is either ground into the form of a powder, or dissolved in a solution of alcohol or other suitable solvent, and such resin, or resinous solution has then added thereto a suitable hardening agent, for example, from 5 to 20 parts by weight of hexa-methylene-tetramin.

We have found that this intermediate product, when subjected, as during the molding operation, to a relatively low degree of heat, say 250° to 350° F., for a relatively short period of time, for example, from 1 to 10 minutes, will react to assume its final, infusible and insoluble state. Therefore, in practice it is desirable, where quick molding is required, to use in connection with the fusible furfural-phenol resin some such hardening and accelerating agent as herein mentioned. Of course this quick reacting fusible resin may be mixed with suitable fillers, or incorporated or impregnated in fiber board or other filling structures.

If it is desired to further quicken or accelerate the reaction of the phenolic resin, and to increase the insolubility thereof, we have found that the addition of a small amount of para-phenylene-diamine, for instance, in proportion of 1% to the amount of resin, will have the desired effect. It will, of course, be understood that our furfural-phenol product may be used in conjunction with fillers of various sorts, and with the addition of pigments and dyes of various colors.

Where we have herein used the word "phenol," we wish this to be understood as including, or being equivalent of cresol, resorcinol, naphthol, and substances having similar characteristics; and wherein we have used the term "furfural," we wish this to be understood as embracing as equivalent any derivative of or any product or compound containing or engendering furfural and which is useful or adapted for our purpose.

What we claim is—

1. A potentially reactive synthetic resin comprising a soluble, fusible condensation product formed through the interaction, under heat, of but two substances, namely, phenol and furfural, and wherein substantially all of the phenol and furfural are in chemical combination.

2. A potentially reactive synthetic resin comprising a soluble, fusible, substantially anhydrous condensation product formed through the interaction, under heat, of but two substances, namely, phenol and furfural, and wherein substantially all of the phenol and furfural are in chemical combination.

3. A potentially reactive synthetic resin comprising a soluble, fusible condensation product formed through the interaction, under heat, of but two substances, namely, phenol and furfural, and wherein substantially all of the phenol and furfural are in chemical combination, said product being capable, upon further heating, of assuming a hard, infusible, insoluble and homogeneous form.

4. A potentially reactive synthetic resin comprising a soluble, fusible condensation product formed through the interaction, under heat, of but two substances, namely, phenol and furfural, and wherein substantially all of the phenol and furfural are in chemical combination, and a hardening agent added to said condensation product.

5. A potentially reactive synthetic resin comprising a soluble, fusible, condensation product formed through the interaction, under heat, of but two substances, namely, phenol and furfural, and wherein substantially all of the phenol and furfural are in chemical combination, and an active methylene body added to said condensation product as a hardening agent.

6. A potentially reactive synthetic resin comprising a soluble, fusible, condensation product formed through the interaction, under heat, of but two substances, namely, phenol and furfural, and wherein substantially all of the phenol and furfural are in chemical combination, and hexamethylenetetramin added to said condensation product as a hardening agent.

7. The herein described process of making a potentially reactive synthetic resin which comprises subjecting a mixture of but two substances, namely, phenol and furfural, to heat, at a temperature sufficiently high, and for a sufficient length of time to cause the chemical combination of the phenol and furfural and form a potentially reactive, fusible, soluble resin-like mass.

8. The herein described process of making a potentially reactive synthetic resin which comprises subjecting but two substances, namely, phenol and furfural, to the action of heat, at a temperature sufficiently high and for a sufficient length of time to combine substantially all of the phenol and furfural to form a potentially reactive mass, and then further subjecting said potentially reactive mass to the action of additional heat, under pressure, for a sufficient length of time to convert the mass into a homogeneous, infusible, insoluble body.

9. The herein described process of making a synthetic resin product which comprises subjecting a mixture of but two substances, namely, phenol and furfural to the action of heat to first produce the soluble, fusible, potentially reactive condensation product, then adding a hardening agent and subjecting the mass to further heat to produce an infusible, insoluble body.

10. The process of making a synthetic resin composition which comprises subjecting a mixture of but two substances, namely, phenol and furfural, to heat, to first place the phenol and furfural in chemical combination, and then adding hexamethylenetetramin as a hardening agent, and then subjecting the mass to further heat to produce a solid, homogeneous, insoluble and infusible body.

11. The process of making a synthetic resin composition which comprises first producing a soluble, fusible condensation product by heating a mixture of but two substances, namely, phenol and furfural, at a temperature of above 350° F. for a sufficient length of time to form a potentially reactive condensation product capable of being solidified upon the further application of heat.

12. The process of making a synthetic resin composition which comprises first producing a soluble, fusible condensation product by heating a mixture of but two substances, namely, phenol and furfural, at a temperature of above 350° F. for a sufficient length of time to form a potentially reactive condensation product, and then subjecting said potentially reactive condensation product to further heat to produce a solid, homogeneous, insoluble and infusible product.

13. The process of making a synthetic resin composition which comprises first producing a soluble, fusible condensation product by heating a mixture of but two substances, namely, phenol and furfural, at a temperature of above 350° F. for a sufficient length of time to form a potentially reactive condensation product, then adding a hardening agent, and then subjecting the mass to further heat to produce an insoluble, infusible body.

14. The herein described process which comprises forming an infusible and insoluble synthetic resin by subjecting a mixture of phenol and furfural to the action of heat for a sufficient length of time to convert the mixture into a solid, infusible body, then grinding said body, and then mixing the ground material with a potentially reactive synthetic resin.

15. The process of producing synthetic plastic material, which comprises partial condensation of a phenolic body with a fural yielding substance in proportions and under conditions of physical and chemical activation such as to enable arrest of the condensation reaction at any intermediate stage, and subsequent ultimate hardening of the resultant product through action involving only constituents of such product.

16. The process of producing synthetic plastic material, which comprises partial condensation of a phenolic body with fural yielding substance in proportions and under conditions of chemical activation such as to enable, through temperature control, both arrest of the condensation reaction at any intermediate stage and subsequent ultimate hardening of the resultant product through action involving only constituents thereof.

In testimony whereof we have signed the foregoing this 15th day of September, 1921.

EMIL E. NOVOTNY.
DONALD S. KENDALL.